United States Patent
Yeddanapudi et al.

(10) Patent No.: US 9,313,133 B2
(45) Date of Patent: Apr. 12, 2016

(54) ANTICIPATORY WARM-UP OF CLUSTER RESOURCES FOR JOBS PROCESSED ON MULTIPLE CLUSTER NODES

(71) Applicant: Robin Systems, Inc., Milpitas, CA (US)

(72) Inventors: Krishna Satyasai Yeddanapudi, Pleasanton, CA (US); Christopher Alan Mildebrandt, San Jose, CA (US); Rao V. Madduri, Benicia, CA (US)

(73) Assignee: ROBIN SYSTEMS, INC., San Jose, CA (US)

( * ) Notice: Subject to any disclaimer, the term of this patent is extended or adjusted under 35 U.S.C. 154(b) by 15 days.

(21) Appl. No.: 14/174,209

(22) Filed: Feb. 6, 2014

(65) Prior Publication Data

US 2015/0074671 A1 Mar. 12, 2015

Related U.S. Application Data

(60) Provisional application No. 61/876,045, filed on Sep. 10, 2013.

(51) Int. Cl.
| | |
|---|---|
| *G06F 9/54* | (2006.01) |
| *H04L 12/801* | (2013.01) |
| *G06F 9/50* | (2006.01) |
| *G06F 9/455* | (2006.01) |
| *H04L 12/851* | (2013.01) |
| *G06F 11/34* | (2006.01) |

(52) U.S. Cl.
CPC ............... *H04L 47/11* (2013.01); *G06F 9/455* (2013.01); *G06F 9/5038* (2013.01); *G06F 9/544* (2013.01); *G06F 9/546* (2013.01); *G06F 11/34* (2013.01); *H04L 47/2441* (2013.01)

(58) Field of Classification Search
None
See application file for complete search history.

(56) References Cited

U.S. PATENT DOCUMENTS

| | | | | |
|---|---|---|---|---|
| 2003/0018691 | A1* | 1/2003 | Bono | G06F 9/4881 718/106 |
| 2008/0027920 | A1* | 1/2008 | Schipunov et al. | 707/4 |
| 2010/0087941 | A1* | 4/2010 | Assaf | G06Q 10/06 700/101 |
| 2012/0317579 | A1* | 12/2012 | Liu | 718/104 |
| 2013/0058412 | A1* | 3/2013 | Chen | H04N 19/436 375/240.13 |

* cited by examiner

*Primary Examiner* — Tuan Dao
(74) *Attorney, Agent, or Firm* — David R. Stevens; Stevens Law Group (57) ABSTRACT

Systems and methods are disclosed for reducing latency in processing data sets in a distributed fashion. A job-queue operable for queuing data-processing jobs run on multiple nodes in a cluster may be communicatively coupled to a job analyzer. The job analyzer may be operable to read the data-processing jobs and extract information characterizing those jobs in ways that facilitate identification of resources in the cluster serviceable to run the data-processing jobs and/or data to be processed during the running of those jobs. The job analyzer may also be coupled to a resource warmer operable to warm-up a portion of the cluster to be used to run a particular data-processing job prior to the running of the job. In some embodiments, mappers and/or reducers may be extracted from the jobs and converted into compute node identifiers and/or data units identifying blocks for processing, informing the warm-up operations of the resource warmer.

20 Claims, 8 Drawing Sheets

ANTICIPATORY WARM-UP OF CLUSTER RESOURCES FOR JOBS PROCESSED ON MULTIPLE CLUSTER NODES

RELATED APPLICATIONS

This application claims the benefit of and hereby incorporates by reference U.S. Provisional Application Ser. No. 61/876,045, entitled Virtual Hadoop Clusters and filed on Sep. 10, 2013.

FIELD OF THE INVENTION

This invention relates to the handling of data-processing jobs and more particularly to the handling of data-processing jobs run on partitioned subsets of data in parallel on multiple nodes of a cluster of nodes.

BACKGROUND OF THE INVENTION

The ability to process large amounts of data within shorter periods of time is growing in importance. For one thing, more and more data is being produced as more mobile technologies with larger information-sensing capacities are spreading, more people interact over the internet via social media, and more devices become equipped with smart technologies, among other reasons. Some of such sources include web searches, email, logs, internet marketing, geospatial data, financial data, space research, healthcare data, scientific research, and more. Furthermore, the world's ability to store data is increasing, according to one study, for example, the world's per-capita data storage capacity has been doubling every 40 months since the 1980s.

Not only are larger and larger data sets becoming more common, but the processing of such data sets is becoming increasingly important in more areas. Large data sets are frequently involved in several areas of research from meteorology, to genetics, to many other fields of research requiring complex modeling. The ability to process large amounts of data has also become important in more every-day applications from finance, marketing, e-commerce, social media, and internet searches. However, the growing size of data sets that must be processed to support functionalities in these and other areas is often so large that traditional processing approaches are either impractical, or simply impossible.

To make possible the processing of large data sets, often the presence of multiple chunks that can be processed independently is leveraged to break up the job for parallel processing. Parallel processing can occur on several nodes, or machines, simultaneously, greatly speeding up the underlying job. However, sending large amounts of data across a network for processing can introduce its own complexities, take time, and occupy large amounts of bandwidth within a network. Many other complex problems arise in distributed processing generally, such as the details of the parallel and distributed processing itself and the handling of errors during processing.

In the late 1990s and early 2000s, in the process of addressing problems associated with indexing the massive amounts of information that its search engine relies on, Google noticed several features common to many big-data processing problems. As a result, it developed a distributed file system, the Google File System (GFS), that provides a framework for breaking-up and storing large data sets across physically independent commodity machines interlinked by a network and lends itself to the processing of those large data sets. Additionally, Google developed a framework, known as the MapReduce framework, for processing distributed data sets implemented in two main phases. These main phases comprise a map phase that takes input files with key value pairs and produces intermediate files with new key value pairs and a reduce phase that combines values from common keys in the intermediate files.

In 2003 and 2004 Google published its GFS and MapReduce framework respectively in two papers. These papers, together with a lot of collaboration from large corporations and other contributors have led to open source versions of the foregoing system and framework, respectively referred to as the Hadoop Distributed File System (HDFS) and Hadoop MapReduce engine, or collectively as simply Hadoop. Whether in terms of Google's version, Hadoop, or some other version, these distributed file systems and MapReduce frameworks have proved a boon to big data processing, in such areas as search, analytical functions, transformations, aggregations, data mining, among others, and have become ubiquitous in the field. However, additional demands, such as those of larger data sets and needs for quicker processing times, require additional innovations that can sit atop Hadoop-like approaches and potentially other approaches to distributed processing. The following description and claims set forth such innovations.

BRIEF DESCRIPTION OF THE DRAWINGS

In order that the advantages of the invention will be readily understood, a more particular description of the invention will be rendered by reference to specific embodiments illustrated in the appended drawings. Understanding that these drawings depict only typical embodiments of the invention and are not, therefore, to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, can be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Although distributing processing duties for large data-processing jobs across several nodes can make the running of such jobs possible and/or practical, getting the data to those nodes can introduce complexities and slow down the jobs. Hadoop and Hadoop-like approaches (hereinafter "Hadoop approaches") provide a framework that reduces these complexities by providing frameworks that transparently and intelligently handle the storage of and processing of large data sets in a way that, in a sense, takes the processors to the data, as opposed to taking the data to the processors. However, the very strength of these approaches in reducing data handling obscures additional approaches where improvements can be made in terms of the details of the way data is handled.

Hadoop approaches are designed to place processors in close proximity to the data blocks which they process, which likely reside on or near those nodes. However, such data blocks still need to be loaded into caches at those nodes. Additionally, although the distances are usually reduced by Hadoop approaches, some data blocks may need to be transferred to the nodes where they are processed. In some instances, which extend the capabilities of Hadoop approaches, data blocks may even reside outside the cluster where they are processed, for example in the cloud. Typical data block sizes involved in Hadoop approaches are 128 Mega Bytes (MBs) and above, indicative of the delays that warm-up activities like loading caches and transferring data blocks can produce.

The present application discloses innovations to reduce these latencies. For example, a system to reduce latencies may involve a job analyzer, which may be implemented as a module as discussed below, that is communicatively coupled to a job queue. The job queue may be operable for queuing data-processing jobs to be run in a distributed fashion on multiple nodes in a cluster of nodes. The job analyzer may be operable to read one or more data-processing jobs in the job queue and/or extract characterization information from one or more data-processing jobs. The characterization information extracted by the job analyzer may characterize one or more resources in a cluster of nodes for processing such jobs. The one or more resources may be serviceable and/or designated to run a given data-processing job, or pool of data-processing jobs. Additionally, or in the alternative, such characterization information may characterize, identify, and/or facilitate identification of data to be processed by the given data-processing job, or pool of data-processing jobs.

Such a system may also include a resource warmer, which may also be implemented as module, communicatively coupled to the job analyzer and to the cluster. The resource warmer may be operable to warm up a portion of the cluster to be used to run the given data-processing job or pool of data-processing jobs. The portion may be identified by the characterization information extracted from the given data-processing job, or pool of data-processing jobs. Once the portion of the cluster has been warmed-up, the given data-processing job, or pool of data-processing jobs, may be run without the latency of the previously accomplished warm-up period.

In some examples, the system may also include a conversion model communicatively coupled to the job analyzer. The conversion module may be operable to convert characterization information, which may comprise a set of mappers and/or a set of reducers, into a set of compute node identifiers for nodes at which the given data-processing job, or pool of data-processing jobs, is to be run and/or a set of data units identifying data blocks/replicas to be processed during the data-processing job. In such examples, the resource warmer may receive the set of compute node identifiers and/or the set of data units. Furthermore, in certain examples, the resource warmer may warm up the portion of the cluster by provisioning one or more of the data blocks/replicas identified by the set of data units to one or more nodes in the cluster. In some embodiments, provisioning data blocks/replicas may further involve loading them in one or more caches at the nodes indicated by the compute node identifiers.

Figure 1:
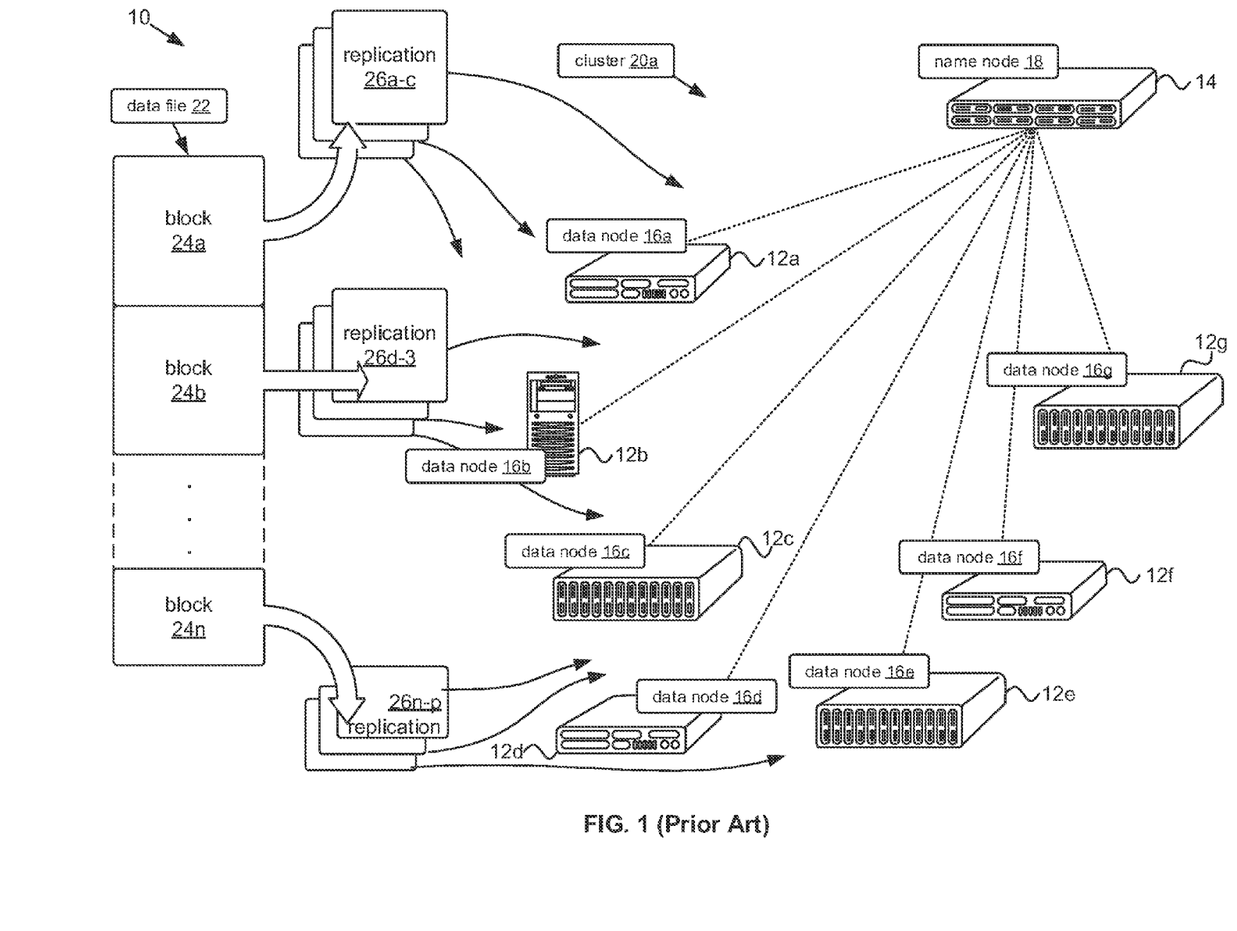
FIG. 1 is a schematic block diagram of a distributed filing system in accordance with prior art.
Figure 2:
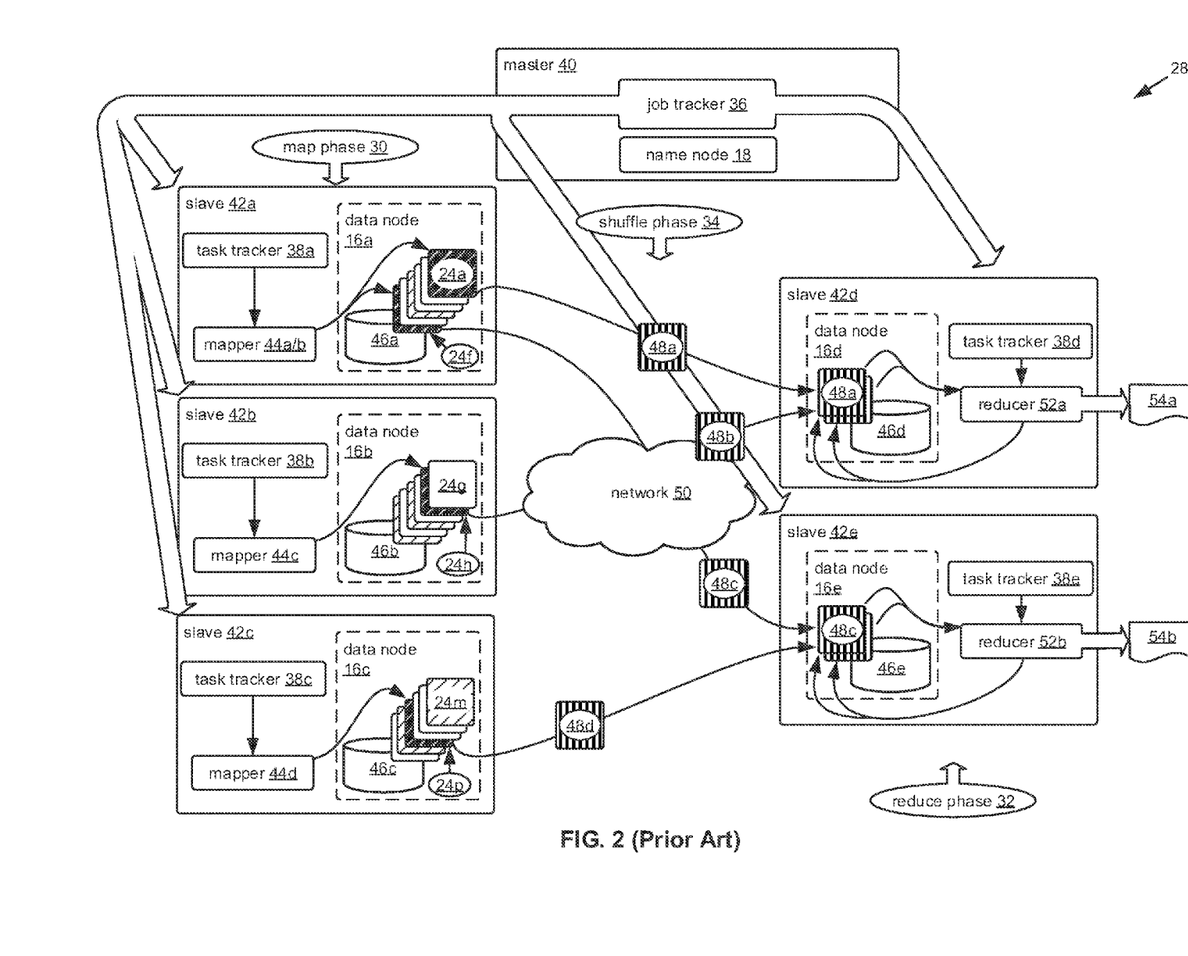
FIG. 2 is a schematic block diagram of a MapReduce framework/engine in accordance with prior art.

To provide a more thorough account of embodiments of the present innovations, it is helpful to provide some additional contextual information about approaches to processing large data sets, such as Hadoop approaches. Therefore, FIGS. 1 and 2 are provided that explain the two key concepts involved in Hadoop approaches. These two concepts are automated, distributed filing systems, like GFS and HDFS, and the MapReduce framework/engine.

Referring to FIG. 1, an Automated, Distributed Filing System (ADFS) 10 is depicted, consistent with examples such as GFS or HDFS, as applied in Hadoop approaches. The ADFS 10 may be implemented in software and/or firmware and/or the like residing at various hardware components 12a-12g, 14 with the use of modules, as discussed below. The hardware components 12a-12g, 14 may comprise commodity hardware and/or specially purposed hardware. The various hardware components 12a-12g, 14 may provide the infrastructure for various data nodes 16a-16g and a name node 18, to be discussed in greater detail below, which comprise a cluster 20a.

The ADFS 10 may be configured to receive a large data file, or data set, 22 and split the large data set 22 into multiple blocks 24a-24n (also referred to as data blocks) for storage on multiple data nodes 16, thereby increasing the potentially available storage capacity of the ADFS 10. In some examples, the data set 22 may include multiple files that share a logical grouping. The blocks 16 may be fairly large in size, for example, from tens of megabytes to gigabytes. To provide redundancy, in case a data node 16 on which a given block 24 is stored fails and/or to provide greater access to the blocks 24, the blocks 24 may be replicated to produce a number of replicas 26a-c, 26d-f, 26n-p of each block 24a, 24b, 24n. As used in this application, the term block 24 is synonymous with any replica 26 carrying the same data. Although the example depicted in FIG. 1 depicts three replicas 26 for each block 24, as can be appreciated, any number of ratios of replicas 26 to different blocks 24 may be used. These replicas 26 may then be stored at the various data nodes 16, which may store one or more blocks 24 and/or replicas 26.

The ADFS 10 may be configured for fault tolerance protocols to detect faults and apply one or more recovery routines. To assist in fault tolerance, the data nodes 16 and the name node 18 may be configured with a web server. Also, the ADFS 10 may be configured to store blocks/replicas 24/26 as close to processing logic on the hardware components 12a-12g, 14 as possible so that a data-processing job can be run on the blocks 24 pertaining to the data set 22 with minimal block transfers. Also, multiple different data sets 22, may be stored on the cluster 18 in this way.

The name node 18 may fill a role as a master server in a master/slave architecture with data nodes 16*a-g* filling slave roles. Since the name node 18 may manage the namespace for the ADFS 10, the name node 18 may provide awareness, or location information, of the various locations at which the various blocks/replicas 24/26 are stored. For example, the name node 18 may maintain a directory tree of all the blocks/replicas 24/26 in ADFS 10 and may track where the various blocks/replicas 24/26 are stored across the cluster 20*a*. Furthermore, the name node 18 may determine the mapping of blocks/replicas 24/26 to data nodes 16. Under the direction of the name node 18, the data nodes 16 may perform block creation, deletion, and replica functions.

Although only seven data nodes 16*a-g* are depicted in FIG. 1 for purposes of illustration, as can be appreciated, any number of nodes 16, including numbers in the thousands, are possible. As described with respect to FIG. 1, an ADFS 10 may provide automation and infrastructure for placing a large data set 22 on several data nodes 16 as blocks/replicas 24/26, spread out on physically different machines/nodes 12,14,16, 40,42 and even across data centers, in effect, taking the processing logic close to the data. In the process, the ADFS 10 may set the stage for various approaches to distributed and/or parallel processing. For example, as discussed below, the locational awareness of the ADFS 10, may be leveraged to provide more efficient approaches to distributed and/or parallel processing. The following figure is used to provide context relevant to the innovations explained herein of one such approach.

Referring to FIG. 2, elements of a typical MapReduce engine 28 are depicted. A MapReduce engine 28 may implement a map phase 30 and a reduce phase 32, described in further detail below. A MapReduce engine 28 may comprise additional phases, such as a combination phase and/or a shuffle phase 34, also described below, between the map phase 30 and the reduce phase 32.

A master/slave architecture, as discussed with respect to the ADFS 10 in terms of the relationship between the name node 18 and the data nodes 16, may be extended to the MapReduce engine 28 in terms of a job tracker 36, which also may be implemented as a resource manager and/or application master, in a master role and one or more task trackers 38*a-e*, which also may be implemented as node managers, in a slave role. Together, the job tracker 36 and the name node 18 may comprise a master node 40, and individual parings of task trackers 38*a-e* and data nodes 16*a-e* may comprise individual slave nodes 42*a-e*. In some examples, the master node 40 may also be configured with its own data node 16 and task tracker 38.

Consistent with the concept of distributed, parallel processing, a data-processing job may involve multiple component tasks. The job tracker 36 may schedule and monitor the component tasks, coordinating the re-execution of a task where there is a failure. The job tracker 36 may be operable to harness the locational awareness provided by the name node 18 to determine the nodes 42/40 on which various data blocks/replicas 24/26 pertaining to a data-processing job reside and which nodes 42/40 and/or machines/hardware and/or processing logic 12 are nearby.

The job tracker 36 may further leverage such locational awareness to optimize the scheduling of component tasks on available slave nodes 42 to keep the component tasks as close to the underlying data blocks/replicas 24/26 as possible. In the event that the requisite processing logic on a node 42 on which a relevant block/replica 24/26 resides is unavailable, the job tracker 36 may select a node 42 on which another replica 26 resides, or select a node 42 in the same rack, or otherwise geographically proximate, to which to transfer the relevant block/replica 24/26, reducing the load on a network backbone. Owing to its monitoring and rescheduling capabilities, the job tracker 36 may reschedule a component task that fails.

The component tasks scheduled by the job tracker 36 may involve multiple map tasks and reduce tasks to be carried out on various slave nodes 42 in the cluster 20*a*. Individual map and reduce tasks may be overseen at the various slave nodes 42 by individual instances of task trackers 38 residing at those nodes 42. Such task trackers 38 may spawn separate Java Virtual Machines (JVM) to run their respective tasks and/or may provide status updates to the job tracker 36, for example and without limitation, via a heartbeat approach. Although FIG. 2 only depicts five such nodes 42*a-3e* for purposes of illustration. However, any number of nodes may be involved, easily including numbers in the thousands.

During a map phase 30, a first set of slave nodes 42*a-c* may be utilized and/or dedicated for map tasks. For example, a data-processing job may involve processing the various blocks/replicas 24/26 that make up a data set 22. Although the tasks may be run in parallel, the processing of each block/replica 24/26 at the various slave nodes 42*a-c* makes up an individual map task. To execute a map task, a task tracker 36 may apply a mapper 44 to a block/replica 24/26 pertaining to a job being run.

For example, the job tracker 36 may assign a first task tracker 38*a* to apply a first mapper 44*a* to a first data block 24*a* pertaining to a data-processing job being run by the job tracker 36. In some examples, the job tracker 36 may provide the first mapper 44*a* to the first task tracker 38*a*. In other examples, the first mapper 44*a*, or a portion thereof, may already reside at the slave node 42*a* at which the task tracker 38*a* also resides. The first data block 24*a* may reside at a first data node 16*a* that also stores several other blocks/replicas 24/26. The first task tracker 38*a* may select the appropriate data block 24*a* from among the other blocks/replicas 24/26 in a storage volume 46*a* used to maintain the first data node 16*a* at the first slave node 42*a*. A storage volume 46 may comprise a disk on hardware 12 supporting a slave node 42, a solid-state drive, or any other technology for storing data.

Data blocks 24*a*, 24*f*, 24*h*, 24*p* corresponding to a given data-processing job being run by the job tracker 36 in FIG. 2 are depicted with boxes having white, diagonal stripes on a black background, similar to the one labeled 16*a*. As can be appreciated, these blocks 24*a*, 24*f*, 24*h*, 24*p* may be stored in various locations relative to other blocks/replicas 24/26 pertaining to other data-processing jobs and/or data sets 22, indicated by alternative shading patterns. Also, as depicted with respect to the first data node 16*a*, a single data node 16 may store multiple blocks/replicas 24/26 pertaining to a given data-processing job.

A mapper 44 may be executable to treat an input data block/replica 24/26 as a set of key-value pairs. A mapper 44 may proceed to process the block/replica 24/26 by producing a set of intermediate key-value pairs written in an intermediate record 48. An illustrative, but non-limiting example, may be provided in the context of search engines and something like the page-rank algorithm with respect to which, at least in part, MapReduce engines 28 were first developed. In such a context, a web crawler may collect a large data set 22 that stores web pages searched and links between them. In such an example, an ADFS 10, such as GFS, may split this data set 22 into many blocks/replicas 24/26, each of which may become an input for a mapper 44.

A mapper 44, in such an example, may view the input block/replica 24/26 as a set of key-value pairs, where a key may correspond to a source page and a value may correspond to a target page to which a link on the source page points. The mapper 44 may run as a function applied to each key-value pair, in the process counting the number of pages that link to a given target page. In such an example, the target page, which corresponds to the value parameter of the input, may become the key parameter in a new key-value pair produced by the mapper 44 and recorded in an intermediate record 48. In such example, the value parameter of the new key-value pair, may be the number of links to the target page from various source pages. An intermediate record 48 may, therefore, be a set on new key-value pairs generated by applying a map function to a set of key-value pairs in the input block/replica 24/26. In the example, an intermediate record 48 would correspond to a set of new key-value pairs comprising a set of target pages paired with counts of links to those target pages.

However, after a map phase 30, the results for a data-processing job may be scattered across several different intermediate records 48a-d. The reduce phase 32 may be applied to bring these scattered results together. A shuffle phase 34 may be implemented to facilitate the reduce phase 32. During the shuffle phase 34, the intermediate records 48 may be shuffled so that intermediate records with common keys, e.g. 48a, 48b and 48c, 48d, may be directed across a network 50, which may connect various nodes 40, 42 in a cluster 20a, to nodes 42d, 42e with the same reducers 52, e.g., 52a and 52b respectively.

The job tracker 36 may schedule a reducer phase 32 to task trackers 38d-e on slave nodes 42d-e within a cluster 20a. Data nodes 16d-e at those slave nodes 42d-e may receive intermediate records 48a-d over a network 50 for storage in corresponding storage volumes 46d-e. Individual task trackers 38d-e may apply a reducer 52a/52bb to the intermediate records 48a-b/48c-d stored by the data node 16d/16e at the corresponding slave node 42d/42e. In some examples, the job tracker 36 may provide a reducer 52a to a first task tracker 38d. In other examples, the reducer 52a, or a portion thereof, may already reside at the slave node 42d at which the task tracker 38d also resides.

Although a map phase 30 and a reduce phase 32 may run in two distinct phases, in some examples, they may be overseen by a common task tracker 38d. Conversely, a map phase 30 and a reduce phase 32 may be overseen by two distinct task trackers 32a, 32d. Even though reducers 52 may not start until all mappers 44 are complete, shuffling may begin before all mappers 44 are complete.

Although at least one mapper 44 runs on each node 42 that has data 24 for the job, reducers 52 are not constrained to the nodes 42 on which they run by considerations of data locality. Reducers 52 may be assigned to run in the network 50 with flexibility. Hence, the job tracker 36 may assign tasks to less loaded task trackers 38. For example, the load may be assigned toward the achievement of an evenly distributed load. One approach to evenly distribute the load may involve assigning a reducer 52 to run on all available nodes 42 if there are enough reducers 52 in the job. Also, the intermediate records/files 48 (mapper output) may avoid the overhead associated with replication associated with the data blocks 24.

A reducer 52 may run on multiple intermediate records 48 to produce an output record 54. An output record 54 generated by such a reducer 52 may group values associated with common keys to produce combined values. Picking up with the previous example, the counts for links to the various target pages in the various intermediate records 48 could, for example, be summed. In such a way, one or more reduce phases 32 may be used to combine the results from several different mappers 44 in different intermediate files 48 to create a result for a data-processing job. Due to the way in which individual mappers 44 and/or reducers 52 operate at individual nodes 42/40, the term 'mapper' and/or 'reducer' may be used to refer to the nodes 42 at which individual instances of mappers 44 and/or reducers 52 are implemented. As can be appreciated, a MapReduce engine 28 may compose any different number of map phases 30 and/or reduce phases 32 in any different combination, where a reduce phase 32 follows one or more map phases 30, to run a given data processing job.

The functions involved in implementing such an ADFS 10, some other distributed filing system, a Hadoop engine 28, some other approach for processing distributed data, and/or the innovations discussed herein may be handled by one or more subsets of modules. With respect to the modules discussed herein, aspects of the present invention may take the form of an entirely hardware embodiment, an entirely software embodiment (including firmware, resident software, micro-code, etc.), or an embodiment combining software and hardware aspects that may all generally be referred to herein as a "module." Furthermore, aspects of the presently discussed subject matter may take the form of a computer program product embodied in any tangible medium of expression having computer-usable program code embodied in the medium.

With respect to software aspects, any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that may contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. Aspects of a module, and possibly all of the module, that are implemented with software may be executed on a micro-processor, Central Processing Unit (CPU) and/or the like. Any hardware aspects of the module may be implemented to interact with software aspects of a module.

Figure 3:
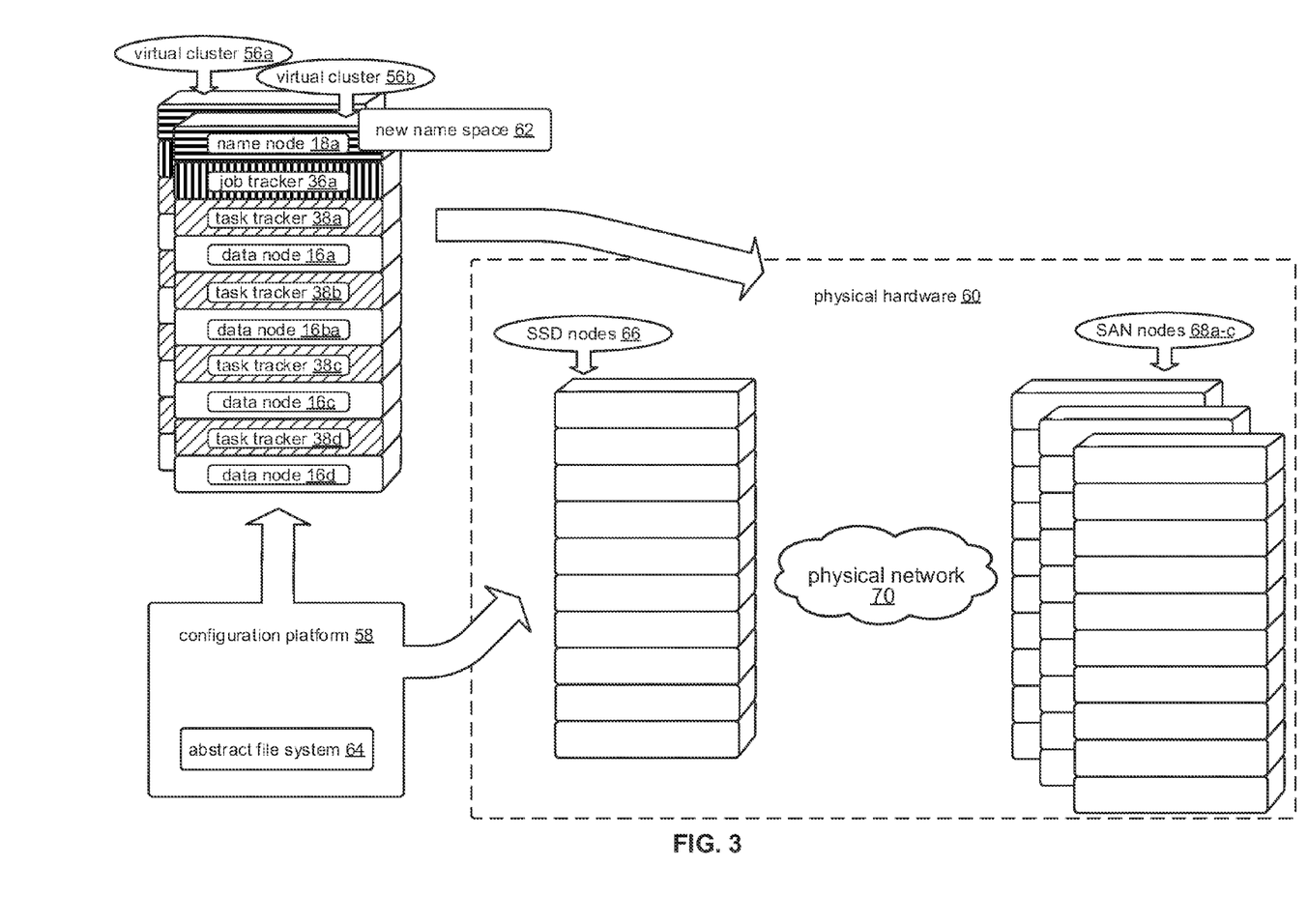
FIG. 3 is a schematic block diagram of the configuration of virtual clusters supported on various computing hardware communicatively coupled to various data sources, in accordance with an embodiment.

Referring to FIG. 3, an implementation of virtual clusters 56 consistent with a Hadoop approach is depicted. Although the virtual clusters 56 depicted in FIG. 3 are discussed below in terms of virtual clusters 56 consistent with a Hadoop implementation, any type of virtual clusters 56, such as open stack clusters 56 are possible. By adding one or more layers of abstraction, the abilities of the Hadoop approach discussed above may be extended through virtualization. Such innovations may provide a configuration platform 58 operable to configure any number of different virtual clusters 56 with any number of data nodes 16, name nodes 18, job trackers 36, and task trackers 38 on a wide variety of physical hardware 60.

Such additional layers of abstraction may involve a new name space 62. The new name space 62 may be configured consistent with an abstract file system 64, which may reside with the configuration platform 58 or elsewhere, operable to store data blocks/replicas 24/26 in a virtual cluster 56. Additionally, safeguards and/or redundancies may be built into this new abstract file system 64 to address problems typical of flash memory, such as, without limitation, data retention problems, to allow data blocks/replicas 24/26 to be stored at the physical layer on Solid State Drives (SSD) 66 implementing such memory. Additional elements and/or abstractions provided to facilitate and configure virtual clusters 56 may be implemented on top of an existing Hadoop approach implementation in the user space, as opposed to the kernel space, of the Hadoop implementation.

The abstractions and/or additional elements discussed above may facilitate implementation and/or removal of virtual clusters 56 and/or additions to and/or removal of nodes 16/18 and/or trackers 36/38 from such virtual clusters 56 on the fly through the configuration platform 58. Virtualization may facilitate the creation of several nodes 40/42 on a single physical node 12. Additionally, the flexibility of virtualization may allow Hadoop implementations on more heterogeneous clusters 20, involving SSDs 66 and/or Hard Disc Drives (HDD) in a Storage Area Network (SAN) 68 for data storage functions communicatively coupled over a physical network 70 and protocols such as Internet Small Computer System Interface (iSCSI). Additional details used to explain the implementation of virtual clusters 56 can be found in the provisional application mentioned above: U.S. Provisional Application Ser. No. 61/876,045, entitled Virtual Hadoop Clusters and filed on Sep. 10, 2013.

Such flexibility can pave the way for implementation of new technologies, such as cloud technologies in the Hadoop framework. Indeed such flexibility could literally lead to the use of physical resources anywhere in the world to support virtual hadoop clusters 56. Such flexibility, however, may have the potential to increase latencies already involved in running data-processing jobs. For example, retrieving a data block/replica 24/26 from a SAN 68 or a cloud service may take time. Such latencies required to prepare a cluster 20/56 for operations may be classified under the category of "warm-up" operations.

Operations to warm up a cluster 20/56 generate latency issues whether the cluster 20/56 is a virtual cluster 56 or not. Such warm-up operations may include loading a data block/replica 24/26 to a cache for processing, which may take significant time for sizes involved in distributed processing, such as those from 64 megabytes to gigabytes. Where the requisite block/replica 24/26 does not reside on a node 42/40 with available processing logic, warm-up latencies may be incurred in transferring the block/replica 24/26 to the requisite node via a network protocol. Such transfers may involve warming up relevant network resources. Additionally, one or more task trackers 38 may require time to spawn one or more JVMs to implement mappers 44 and/or reducers 52, which may also need to be provisioned to the requisite nodes 42/40. The foregoing is not intended as an exhaustive list of potential warm-up operations, but is provided only by way of illustration. As can be appreciated, there may be several additional warm-up operations that may contribute to the latency of running a data-processing job. The discussion with respect to the following figures explains innovations to reduce and/or remove warm-up latencies.

Figure 4:
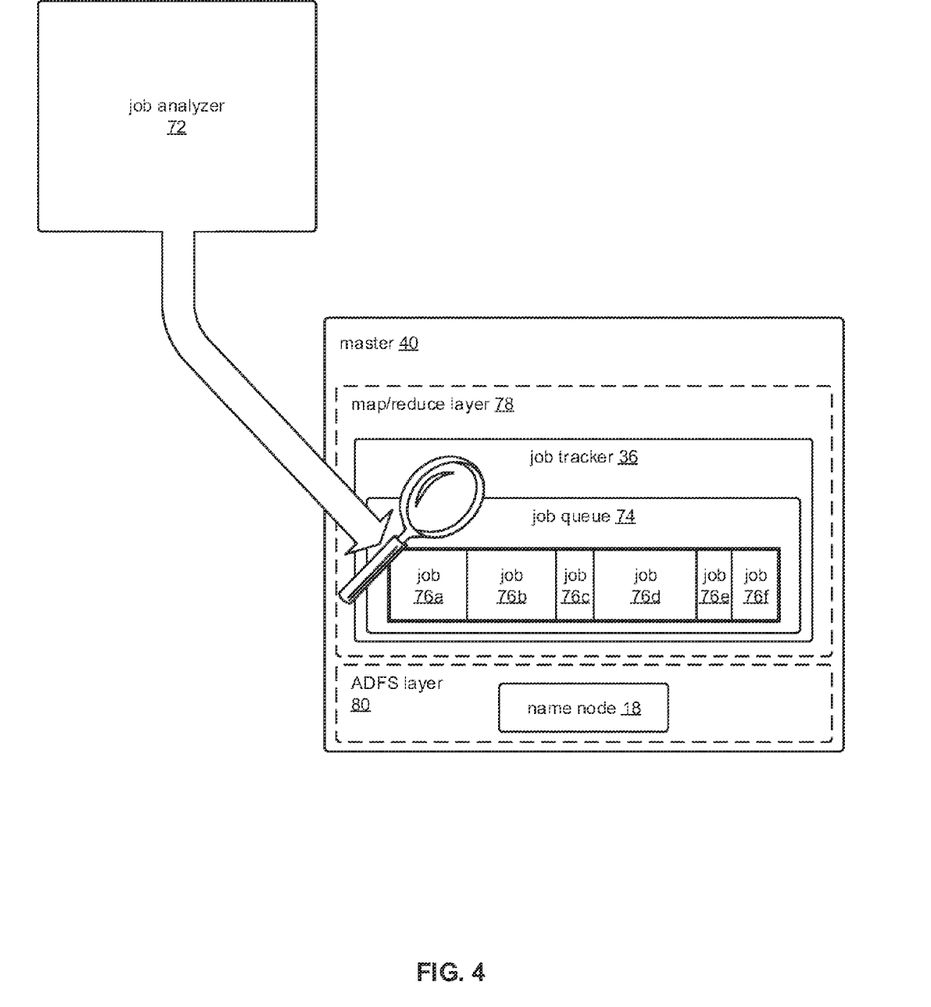
FIG. 4 is a schematic block diagram of a job analyzer reading data-processing jobs in a job queue to extract characterization information from those jobs, in accordance with an embodiment.

Referring to FIG. 4, a job analyzer 72, which may be implemented as a module, is depicted. The job analyzer 72 may be implemented outside of a Hadoop implementation, such as in the user space, while being operable to interface with a job queue 74. The job queue 74 may be operable for queuing data-processing jobs 76*a-f* to be run in a distributed fashion on multiple nodes 42/40 in a cluster of nodes 20/56. In some examples, the job queue 74 may reside at a job tracker 36 pertaining to a MapReduce layer 78 sitting atop an ADFS layer 80 to which a name node 18 may pertain. Where a job tracker 36 maintains scheduler data structures and allows for a pluggable scheduler, the job analyzer 72 enhancement may be provided with the job tracker 36 without having to change a corresponding Hadoop specification.

Being communicatively coupled with the job queue 74, the job analyzer 72 may be operable to read one or more data-processing jobs 76 in the job queue 74. For example, the job analyzer 72 may utilize information about a file structure used to store such data-processing jobs 76 at the master node 40 to read the data-processing jobs 76. Additionally, the job analyzer 72 may be operable to retrieve characterization information from one or more data-processing jobs 76. The characterization information for a given data-processing job 76 may characterize one or more resources in a cluster 20/56 serviceable to run the data-processing job 76 and/or data units, such as one or more data blocks/replicas 24/26, to be processed during the data-processing job 76.

Figure 5:
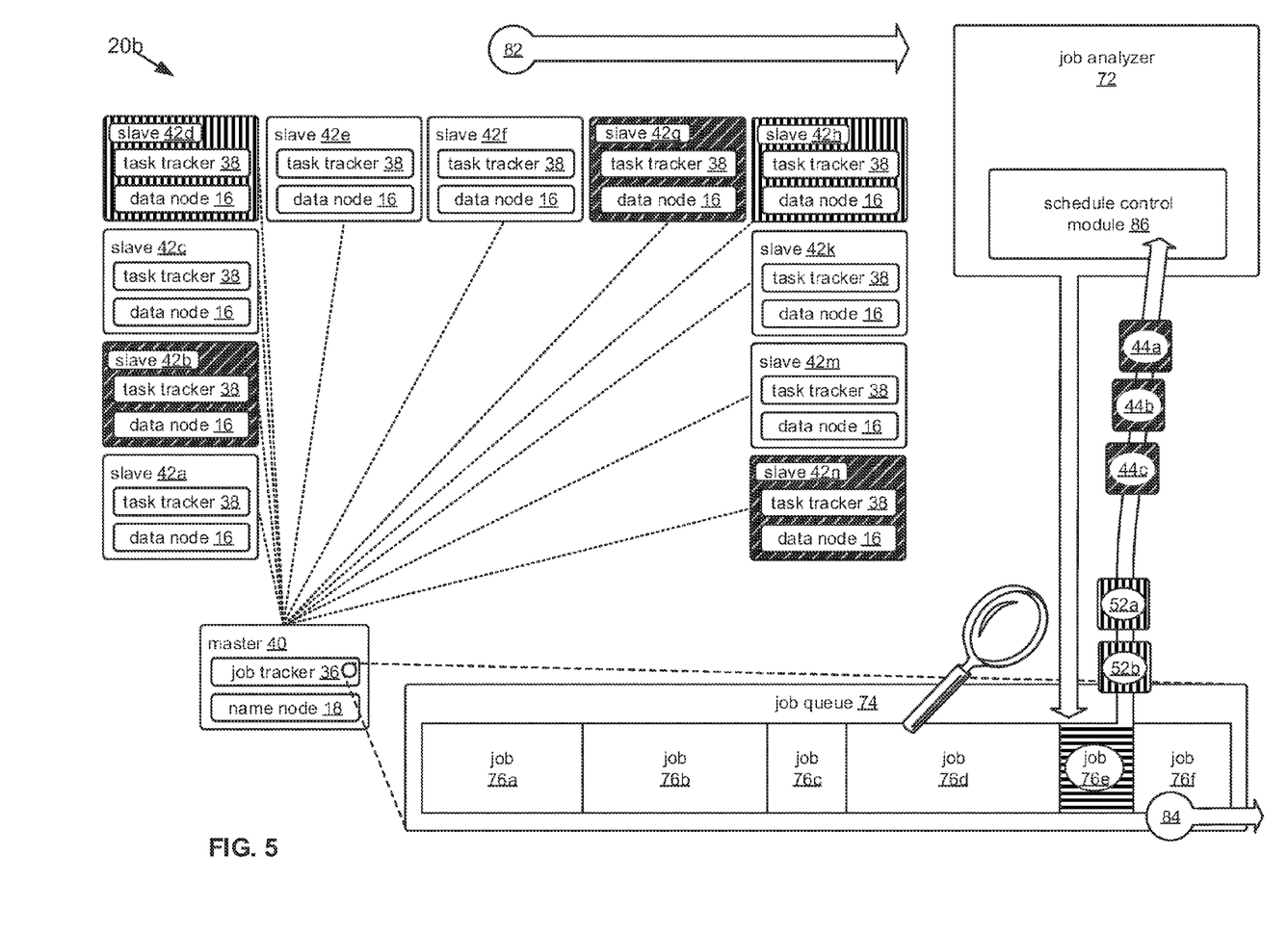
FIG. 5 is a schematic block diagram of the job analyzer extracting a set of mappers and a set of reducers from a particular data-processing job in a job queue, together with nodes in a cluster of nodes corresponding to those mappers and reducers, in accordance with an embodiment.

Referring to FIG. 5, a job analyzer 72 is depicted as operable to traverse 82 across data-processing jobs 76*a-f* for purposes of reviewing the data-processing jobs 76*a-f* in the job queue 74. By way of example and not limitation, the data-processing jobs 76*a-f* in the job queue 74 may be processed in a First In First Out (FIFO) manner such that the data-processing job 76*f* on the right side of the queue 74 may be interpreted as both the first data-processing job 76 into the job queue 74 and the next data-processing job 76 to be processed 84. As can be appreciated, additional approaches, apart from FIFO, for determining when to run data-processing jobs in the queue may be implemented with the disclosure provided herein. Conversely, the data-processing job 76*a* on the left may be interpreted as both the last data-processing job 76 into the job queue 74 and the last data-processing job 76, currently in the queue 74, that will be processed 84.

The job analyzer 72 is depicted examining the second data-processing job 76*e* in line for processing 84, indicated by the horizontal-line pattern. The job analyzer 72 may be operable to extract characterization information from this data-processing job 76*e*. The characterization information may include a set of mappers 44*a-c* and/or a set of reducers 52*a-b* for the data-processing job 76*e*.

The master node 40 on which the job queue 74 may reside may pertain to a cluster 20*b* of nodes 40/42*a-n*. Each node 40/42 in the cluster 20*b* may have data storage capability, in terms of a data node 16, data processing capability, directed by a task tracker 38, and/or software for coordinating 18/36 one or more mapping and/or reducing operations within the cluster 20*b*. The overall data-processing system may include a distribution module (not depicted) operable to divide an input file 22 into multiple splits, or blocks, 24 and/or store at least one copy of each of the multiple splits 24 as data blocks 24 at multiple locations selected from the cluster 20*b* and/or a backend storage device 68, or cloud service. The name node 18 on the master node 40 may receive locational awareness, or location information, identifying the multiple locations of the data blocks/replicas 24/26.

As can be appreciated, the mappers 44*a-c* and/or reducers 52*a-b* extracted from the data-processing job 76*e* may correspond to individual nodes 42 in the cluster 20*b*. To illustrate this correspondence, the pattern of white, diagonal stripes on a black background used to illustrate the set of three mappers 44a-c is echoed by the same pattern on three slave nodes 42b, 42g, 42n that correspond to these three mappers 44a-c. The mappers 44a-c may correspond to these three slave nodes 42b, 42g, 42n inasmuch as the mappers 44a-c may be implemented on these nodes 42b, 42g, 42n.

Similarly, the pattern of vertical stripes used to illustrate the set of two reducers 52a-b is echoed by the same pattern on two slave nodes 42d, 42h that correspond to these two reducers 52a-b. In some examples, the reducers 52a-b may be implemented on these nodes 42d, 42h. As the remaining nodes 42a, 42c, 42e, 42f, 42k and 42m in the cluster 20b may not be utilized in the map phase 30, or the reduce phase 32, they are left blank.

In some examples, but not in all examples, a schedule control module 86 may reside at the job analyzer 72 and/or be communicatively coupled to the job analyzer. The schedule control module 86 may be operable to analyze control information, such as, but not limited to, mappers 44 and/or reducers 52 extracted from multiple data-processing jobs 76 in the job queue 74. The schedule control module 86 may further be operable to optimize a pool of data-processing jobs 76 to be run concurrently. The schedule control module 86 may determine the optimization of data-processing jobs 76 to be run concurrently based on data availability. Data unit availability may be defined by a data block/replica 24/26 being available where the data block/replica 24/26 to be processed by one data-processing job 76 in the pool is loaded in a cache for processing by a node 42/40 for another data-processing job 76.

Figure 6:
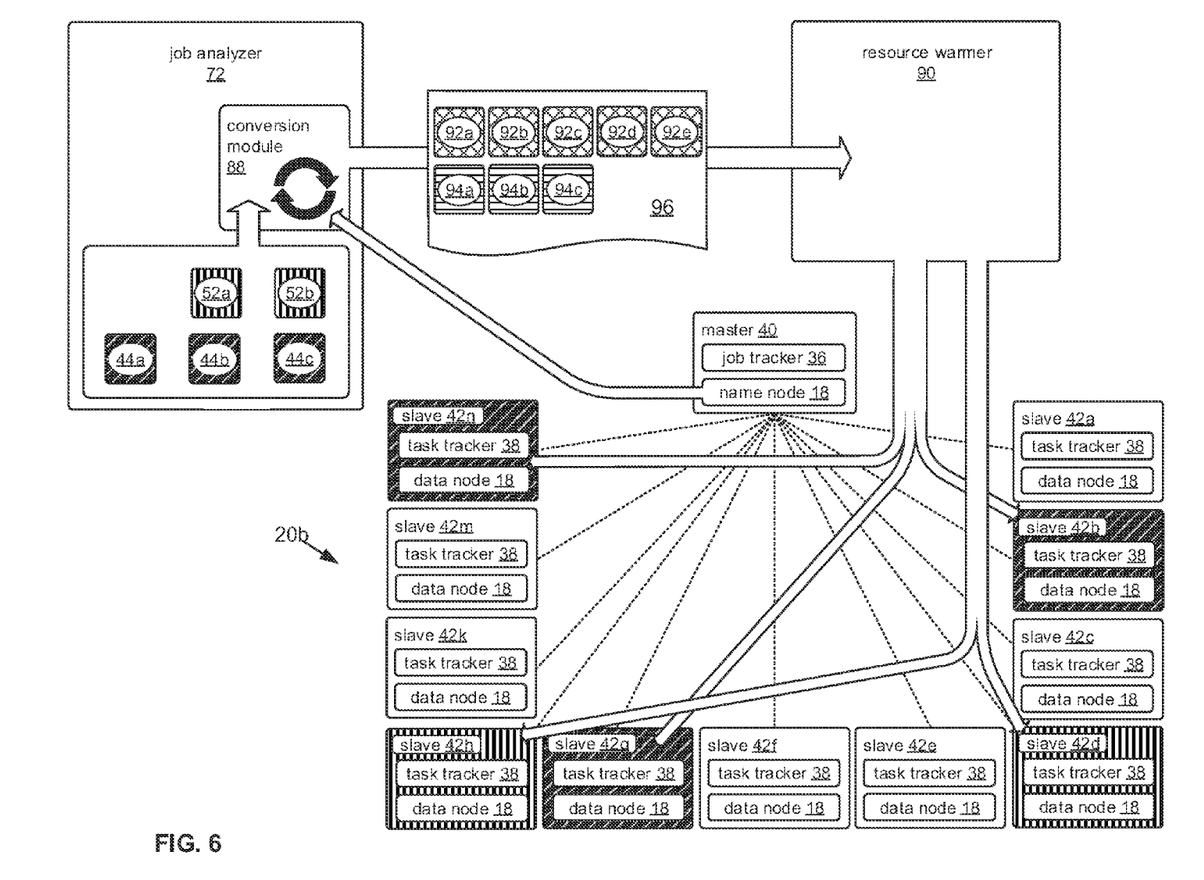
FIG. 6 is a schematic block diagram of both a conversion module, converting a set of mappers and a set of reducers for a data-processing job into a set of compute node indicators in a cluster of nodes for running the job and/or data units to be processed by the job, and a resource warmer, warming-up a portion of the cluster, in accordance with an embodiment.

Referring to FIG. 6, a conversion module 88 and a resource warmer 90, which may be implemented as a module, are depicted in relation to the job analyzer 72. The resource warmer may be communicatively coupled to the job analyzer 72 and to the cluster 20b. The resource warmer 90, which may be implemented separately from the master node 40 while being communicatively coupled to the master node 40, may be operable to warm up a portion of the cluster 20b to be used to run a data-processing job 76e. The portion of the cluster that the resource warmer 90 may warm up may be a portion of the cluster 20b identified from the characterization information extracted from the data-processing job 76e by the job analyzer 72, which may be in communication with the resource warmer 90. The resource warmer 90 may warm up a portion of the cluster 20b/56 for a single data-processing job 76e and/or multiple data-processing jobs 76 from the job queue 74. Where there are insufficient cache resources to fully warm up the cluster 20b/56 for all of the jobs 76 in the job queue 76, a selection may be made of a subset of the jobs 76, which may or may not be based on a processing order of the jobs 76 in the job queue 74.

The conversion module 88 may assist in the identification of the portion of the cluster 20b to be warmed-up. The conversion module 88 may be communicatively coupled to the job analyzer 72 and/or to the resource warmer 90. Although the conversion module is depicted in FIG. 6 as residing at the job analyzer 72, the conversion module 88 may be located elsewhere. The conversion module 88 may be operable to convert the characterization information into a set of compute node identifiers 92a-e at which a given data-processing job 76e is to be run.

The set of compute node identifiers 92a-e may correspond to nodes 42b, 42d, 42g, 42h, 42n at which mapping and/or reducing functions for the data-processing job 76e may occur. Inasmuch as the set of mappers 44a-c may correspond to certain slave nodes 42b, 42g, 42n in the cluster 20b of nodes at which the mappers 44a-c may be implemented, the conversion module 88 may be operable to determine these slave nodes 42b, 42g, 42n and designate these as compute node identifiers 92a-c. In some examples, the conversion module 88 may be operable to determine a proximate and available node 42 for a mapper 44 where the corresponding data block/replica 24/26 does not reside at a slave node 42 with the requisite processing logic available.

In some embodiments, the conversion module 88 may also be operable to determine slave nodes 42d, 42h at which the reducers 52a-b may be implemented and designate these as compute node identifiers 92d-e. The set of compute node identifiers 92a-e may carry additional information to indicate whether a given compute node identifier 92 pertains to a map operation, a reduce operation, or some other processing functionality. The set of compute node identifiers 92a-e may be limited solely to compute node identifiers 92a-c designated for map functions, solely limited to compute node identifiers 92d, 92e designated for reduce functions, or compute node identifiers 92a-e designated solely for both. The set of compute node identifiers 92 may also include compute node identifiers 92 designated for other data-processing functionalities.

The conversion module 88 may be operable, in the alternative or additionally, to convert the characterization information into a set of data unit identifiers 94a-d indicating blocks/replicas 24/26 to be processed during the given data-processing job 76e. Either the conversion module 88, the job analyzer 72, the resource warmer 90, some other module, or any combination of the foregoing may be operable to retrieve multiple locations at which a set of data blocks/replicas 24/26 to be processed in accordance with a given data-processing job 76e are stored. These multiple locations may be retrieved from the name node 18 based on information in the characterization information, such as, but not limited to, various mappers 44 and/or reducers 52.

The name node 18 may be operable to store location information about locations where data blocks/replicas 24/26 reside within the cluster 20b according to a distributed filing system, such as a system consistent with the ADFS 10 described with respect to FIG. 1. The location information may be generated and/or stored in the name node 18 by the distributed filing system. Such location information may be provided at one or more of various levels of granularity, such as, for example, a geographic, a data center, a sector of a data center, a rack, a machine, and/or a particular data node at which, or in which the data block/replica 24/26 is stored.

As stated above, either the conversion module 88, the job analyzer 72, the resource warmer 90, some other module, or any combination of the foregoing may be operable to access the location information from the name node 18. One or more of these entities may also be operable to apply information from the characterization information to the location information to determine where data blocks/replicas 24/26 to be processed during the data-processing job 76e reside. These data blocks/replicas 24/26 may be indicated by the characterization information extracted from the data-processing job 76e.

The job analyzer 72, conversion module 88, resource warmer 90, or some other entity, may also be operable to select nearby nodes 42 at which to process the data blocks/replicas 24/26. Where a data block/replica 24/26 resides at node 42/40 with the requisite processing logic available to process the block/replica 24/26, that node 42/40 may be selected. If the requisite processing logic is not available, one or more algorithms or routines may be applied to select a proximate node with the requisite processing logic available. Status reports may be served from the various nodes 42/40 to determine availability of processing logic.

In some examples, one or more data blocks/replicas 24/26, making up a portion of the data to be processed during the running of a data-processing job 76e, or group of data-processing jobs 76 scheduled to be run concurrently, may reside on a backend storage device 68, such as, without limitation, those discussed with respect to FIG. 3. Although the backend storage device 68 may be outside the cluster 20b, it may also be communicatively coupled to the cluster 20b. The routines and/or algorithms discussed above may be employed to select nodes 42/40 for processing such data blocks/replicas 24/26 within the cluster 20b.

The job analyzer 72 may send a message 96 to the resource warmer 90 with characterization information extracted from one or more data-processing jobs 76. The characterization information may include, without limitation, mappers 44, reducers 52, compute node identifiers 92, and/or data unite identifiers 94. In some examples, the resource warmer 90 may receive a set of compute node identifiers 92 and/or the set of data units identifier 94.

As stated, the resource warmer 90 may be operable to warm up aspects of the cluster 20b indicated by the characterization information as relevant to processing a given data-processing job 76e, or group of data-processing jobs 76 to be run concurrently. The resource warmer 90 may be operable to warm up these aspects in advance of processing the given data-processing job 76e, or group of data-processing jobs 76. In this way, the resource warmer 90 may contribute to removing latencies associated with performing warm-up operations.

Figure 7:
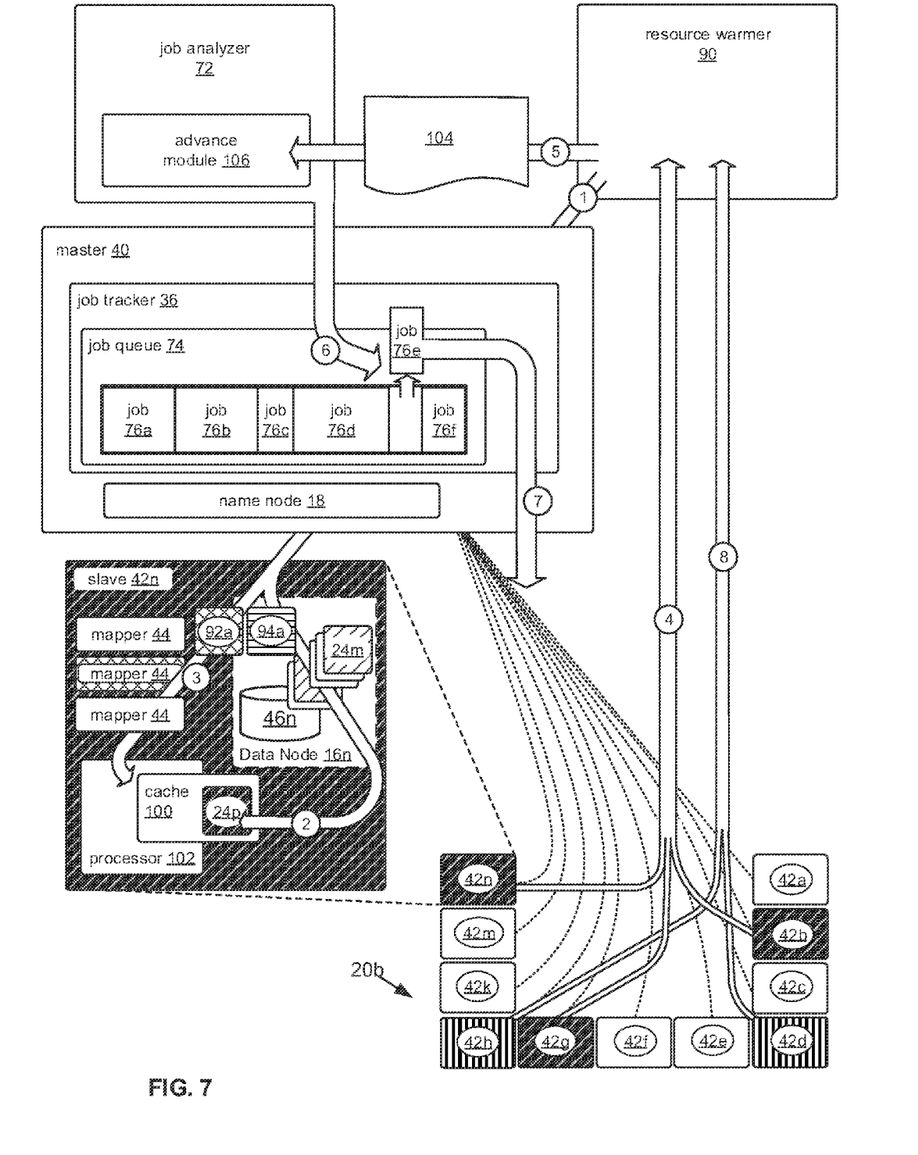
FIG. 7 is a schematic block diagram of a resource warmer warming up a portion of a cluster, on which a data-processing job runs by moving a data block to be processed by the job into a cache of a slave node indicated by a compute node identifier, and notifying a job analyzer of a warm-up status for the cluster, the job analyzer initiating commencement of the corresponding job, in accordance with an embodiment.

Referring to FIG. 7, various potential functionalities of the resource warmer 90 are depicted. In some examples, the resource warmer 90 may be operable to (1) warm up a portion of the cluster 20b. In FIG. 7, the depicted portion only includes a single slave node 42n for purposes of illustration. However, the actual portion may include many more aspects for the cluster 20b, such as slave nodes 42b and 42g in the cluster 20b.

The resource warmer 90 may warm up the portion of the cluster 20b, at least in part, by (2) provisioning a data block/replica 24/26 to a node 42n in the cluster 20b. In other words, the warm up of the aspects of the cluster 20b indicated by the characterization information may involve provisioning the set of data blocks/replicas 24/26 from the multiple locations at which they are stored to caches 100 at the selected slave nodes 42b, 42g, 42n, which may correspond to the compute node identifiers 92a-c, where the data-processing job 76e, or pool of jobs 76, runs. In some examples, where a data block/replica 24/26 does not reside at the node 42/40 where it is to be processed, provisioning the block/replica 24/26 may involve warming up a relevant network resource in the cluster 20b used to relay block/replica 24/26 to the node 42/40 at which the processing will take place. In some examples, the warm-up process may involve bringing one or more blocks/replicas 24/26 into the cluster 20b from the backend 68. In certain examples, provisioning a block/replica 24/26 may further involve loading a data block/replica 24/26 to be processed during a data-processing job 76e, or pool of jobs 76, into a cache 100 for processing logic 102a in the cluster 20b for processing. In certain examples, to avoid data transfer over the network 50 by the use of distributed read to warm up a data node 16 cache 100, the resource warmer 90 may be provided with a cache warming Application Programming Interface (API). By way of example and not limitation, some examples of data-node reads may include consistency checks, health monitoring, and/or the like.

The resource warmer 90 may identify and/or receive identification of the data blocks/replicas 24/26 in the set to be processed based on the characterization information extracted by the job analyzer 72. The resource warmer 90 and/or the warm-up module 98 therein may determine the nodes 42, such as the enlarged slave node 42n in FIG. 7, on which the set of data blocks/replicas 24/26 reside and may further select the relevant data block/replica 24p from among several data blocks/replicas 24/26 in a storage volume 42n of a relevant data node 16n. In some examples, the resource warmer 90 may rely on a data unit 94a identified by the conversion module 88 to identify and/or select the appropriate data block/replica 24/26. In some examples, raw mappers 44 and/or reducers 52 may be used. In other examples, a compute node identifier 92a may be used and/or other characterization information. In some examples, once a data block/replica 24p has been identified, the job analyzer 72, conversion module 88, resource warmer 90, or some other entity, may consult a name node 18 to determine the location, or general location, of the data node 16n at which the data block/replica 24p resides.

In some examples, where multiple mappers 44 and/or reducers 52 are stored at a given node 42/40, information from an extracted mapper 44a and/or a compute node identifier indicator 92a may be used to select (3) the appropriate mapper 44, indicated by the diagonal background pattern in FIG. 7, to apply at the node 42n. Certain nodes 42/40 at which mappers may be implemented may (4) provide a status update when the requisite data block/replica 24/26 for a given data-processing job 76e has been provisioned and/or loaded into a cache 100 to the resource warmer 90 and/or the job analyzer. In some examples, the status update may indicate the status of other warm-up operations, such as those discussed above, and/or only indicate a partial completion of a warm-up operation.

The resource warmer 90 may send an update message 104 with status-update information to the job analyzer 72, where the job analyzer does not receive such information directly. An advance module 106, which may be termed a process module 106, may reside with the job analyzer 72 and/or be communicatively coupled to the job analyzer 72. The advance module 106 may be operable to receive one or more status updates.

Upon a determination that the portion of the cluster 20b relevant to the data-processing job 76e, or pool of data-processing jobs 76, is warmed up, or has reached a level of warm-up that satisfies a predetermined threshold, depending on the example, the advance module 106 may (6) advance, or act to advance, the relevant data-processing job 76e, or pool of data-processing jobs 76 selected by the scheduling module 98, out of the queue 74, regardless of its, or their, position with respect to a FIFO scheduling order, or some other approach for determining when to run data-processing jobs 76 in the queue 74. In some examples, the advance module 106 may be operable to advance (6) the data-processing job 76e, or pool of data-processing jobs 76, for (7) processing upon the warm-up, of the aspects of the cluster 20b indicated by the characterization information, reaching a completion threshold. The advance module 106 may further (7) initiate, or act to initiate, processing the data-processing job 76e, or pool of data-processing jobs 76, by the cluster 20b.

In some examples, the running of one or more data-processing jobs 76 may be broken into various stages such that after a first warm-up and run for a map phase 30, another warm-up and run phase may begin. To illustrate this concept, certain nodes 42/40 at which reducers 52 may be implemented are depicted (8) providing a status update with respect to the provisioning and/or loading of the requisite intermediate records 48 for a given data-processing job 76e. The running of data-processing jobs 76 may be optimized accordingly.

As can be appreciated, the innovations discussed with respect to the previous figures, and to be discussed with respect to the figures that follow, may be implemented on a virtual cluster 56. Such a virtual cluster 56 may include data nodes 16 configured on SSDs 66. As discussed with respect to FIG. 3, such a virtual cluster 56 may use a file system with location awareness and/or with redundancies that addresses data retention issues typical of flash memory.

Figure 8:
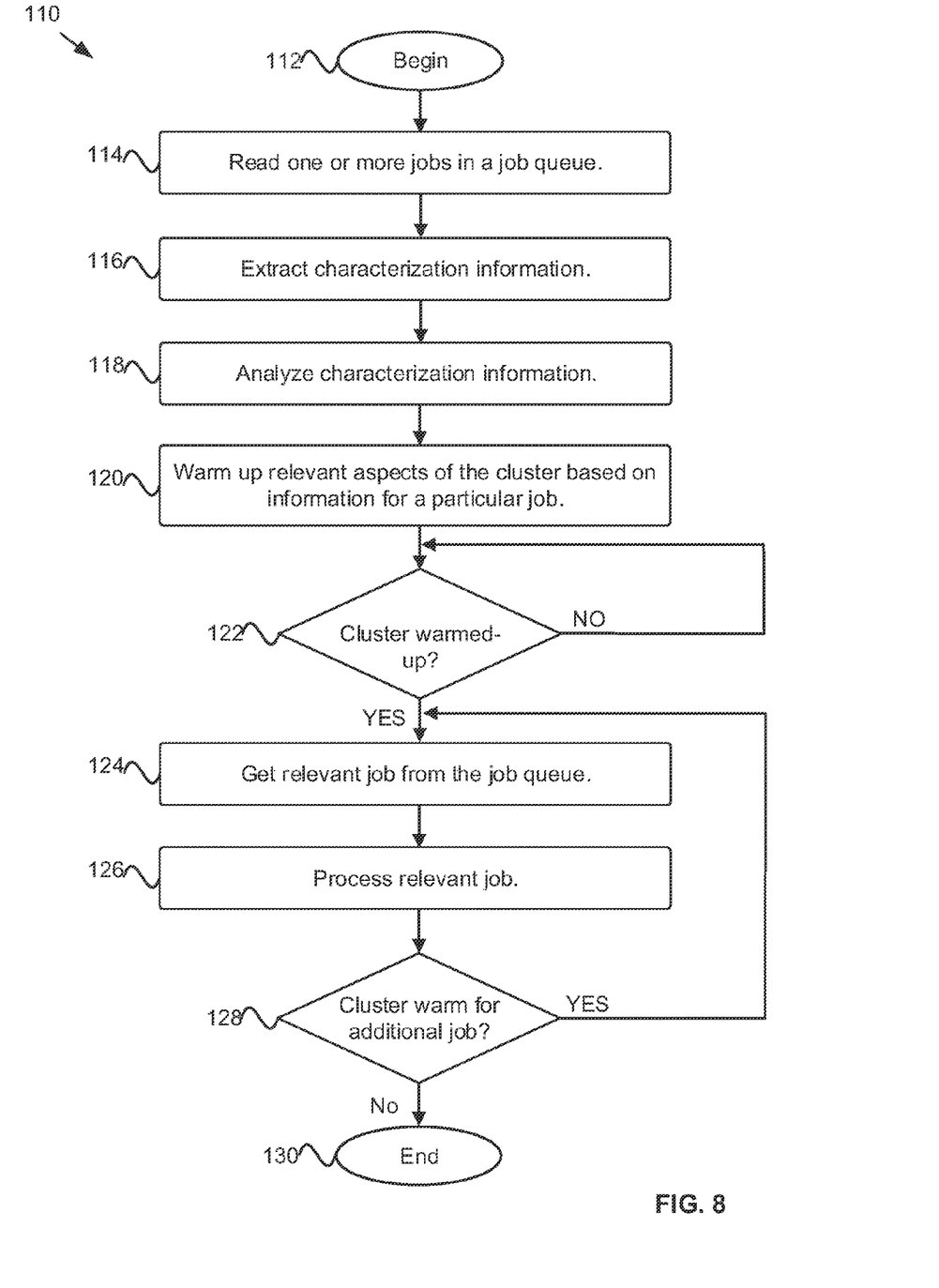
FIG. 8 is a flow chart of methods for warming-up a portion of a cluster of nodes in anticipation of running a data-processing job with characterization information about that job, in accordance with an embodiment of the present invention.

Referring to FIG. 8, methods 110 are depicted for warming-up a portion of a cluster 20b of nodes in anticipation of running a data-processing job 76, or jobs 76. The flowchart in FIG. 8 illustrates the architecture, functionality, and/or operation of possible implementations of systems, methods, and computer program products according to certain embodiments of the present invention. In this regard, each block in the flowcharts may represent a module, segment, or portion of code, which comprises one or more executable instructions for implementing the specified logical function(s). It will also be noted that each block of the flowchart illustrations, and combinations of blocks in the flowchart illustrations, may be implemented by special purpose hardware-based systems that perform the specified functions or acts, or combinations of special purpose hardware and computer instructions.

Where computer program instructions are involved, these computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block-diagram block or blocks.

These computer program instructions may also be stored in a computer readable medium that may direct a computer or other programmable data processing apparatus to function in a particular manner, such that the instructions stored in the computer-readable medium produce an article of manufacture including instruction means which implement the function/act specified in the flowchart and/or block-diagram block or blocks.

The computer program may also be loaded onto a computer or other programmable data processing apparatus to cause a series of operation steps to be performed on the computer or other programmable apparatus to produce a computer implemented process such that the instructions which execute on the computer or other programmable apparatus provide processes for implementing the functions/acts specified in the flowchart and/or block-diagram block or blocks.

It should also be noted that, in some alternative implementations, the functions noted in the blocks may occur out of the order noted in the figure. In certain embodiments, two blocks shown in succession may, in fact, be executed substantially concurrently, or the blocks may sometimes be executed in the reverse order, depending upon the functionality involved. Alternatively, certain steps or functions may be omitted if not needed.

The methods 110 may utilize characterization information about a data-processing job 76, or jobs 76, to warm-up the appropriate portion of a cluster 20/56. The method 110 may begin 112 by 114 reading one or more data-processing jobs 76 in a job queue 74. The data-processing job 76 may be configured for distributed processing of a set of data blocks/replicas 24/26 on a cluster 20/56 of nodes 42/40. The set of data blocks/replicas 24/26 may be stored at multiple locations either in the cluster 20/56 and/or a backend.

The methods 110 may continue by 116 extracting characterization information from the data-processing job 76, or jobs 76. The characterization information may have various types of information characterizing the data-processing job 76, or jobs 76, and/or data and/or cluster resources involved in running the 76, or jobs 76. In some examples, the methods 110 may proceed by 120 warming up aspects of the cluster 20/56 indicated by the characterization information as aspects to be utilized in running the data-processing job 76, or jobs 76.

In other examples, the warm-up step 120 may be proceeded by 118 analyzing the characterization information for identification information. The identification information may identify, without limitation, a data block/replica 24/26 in the set to be processed during the data-processing job 76, jobs 76. The identification information may include one or more locations at which a data block/replica 24/26 in the set is stored, one or more nodes 40/42 in the cluster 20/56 serviceable for processing a data block/replica 24/26 in the set, and/or network resources serviceable to provision a data block/replica 24/26 in the set to a node 42/40 in the cluster 20/56 for processing.

In some examples, 118 analyzing the characterization information for identification information may further involve converting a set of mappers 44 and/or a set of reducers 52 extracted with the characterization information into a set of compute node identifiers 92 serviceable for processing the data-processing job 76, or jobs 76. The analysis step 118 may further involve converting set of mappers 44 and/or a set of reducers 52 into a group of data units indicating data blocks/replicas 24/26 on which the data-processing job 76, or jobs 76 runs. Additionally, the step 118 may involve determining one or more of the multiple locations at which the set of data blocks/replicas 24/26 are stored, whether inside the cluster 20/56 or outside the cluster 20/56. These locations may be obtained, in some examples, from locational awareness information stored in a name node 18.

The methods 110 may wait to proceed until a determination 122 that the relevant aspects of the cluster are warmed up, have warmed up to a predetermined threshold, or a sufficient portion of the aspects of the cluster are warmed up. When an affirmative warm-up determination 122 has been reached, the methods 110 may proceed with running the data-processing job 76, or jobs 76, after at least a portion of the aspects of the cluster 20/56 are warmed up. Running the data-processing job 76, or jobs 76, may involve 124 getting the relevant data-processing job 76, or jobs 76, from the queue 74 and initiating 126 processing of the data-processing job 76, or jobs 76. At this point in many examples, the method 110 may end.

However, in additional examples, an additional determination 128 may be made as to whether additional aspects of the cluster 20/56 warmed up previously for the data-processing job 76, or jobs 76, may be utilized for a second data-processing job 76, or jobs 76. If they are, the second data-processing job 76, or jobs 76, which utilize these aspects, may be selected from the job queue 74 to be run. In other examples involving the running of multiple data-processing jobs concurrently, the methods 110 may involve reading multiple data-processing jobs 74 in the job queue 74.

Such methods 110 may further involve extracting characterization information for each of the multiple data-processing jobs 76. This characterization information may be used for identifying overlapping resources in the cluster 20/56 to be used by more than one data-processing job 76. Based on these overlapping resources, a pool of data-processing jobs may be selected to be run concurrently in the cluster 20/56 that may be used to process the pool of data-processing jobs 76. The overlapping resources may be warmed-up, at which point, processing the pool of data-processing jobs 76 may begin.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. A system for processing large data sets comprising:
   a job queue operable for queuing multiple data-processing jobs, each data-processing job comprising multiple component tasks, to be run in a distributed fashion on multiple nodes, each node comprising at least one of physical memory and at least one processor, in a cluster of nodes; and
   a job analyzer communicatively coupled to the job queue and operable to:
   read the multiple data-processing jobs in the job queue, and
   extract characterization information from the multiple data-processing jobs that characterizes:
   at least one resource in the cluster serviceable to run the multiple data-processing jobs, and
   data to be processed during the multiple data-processing jobs; and
   an advance module, coupled to the job analyzer, operable to initiate processing, contrary to a default approach to processing data-processing jobs in the job queue, of a set of data-processing jobs, upon warm-up operations satisfying a threshold for loading data blocks to be processed by the set into cache for mapper in a cluster portion identified by characterization information for the set, in anticipation of processing the set.

2. The system of claim 1, further comprising a resource warmer communicatively coupled to at least one of the job analyzer and the advance module and to the cluster, the resource warmer operable to:
   anticipatorily warm up the cluster portion to be used to run the set of data-processing jobs in advance of processing the set of data-processing jobs, the cluster portion identifiable from the characterization information for the set of data-processing jobs; and wherein
   the advance module is operable to receive a status update of a level of warm-up in the cluster portion, the status update comprising information that at least one data block is loaded in a cache for processing.

3. The system of claim 2, further comprising:
   a conversion module communicatively coupled to the job analyzer and operable to convert characterization information, comprising at least one of a set of mappers and a set of reducers extracted from the multiple data-processing jobs, into at least one of:
   a set of compute node identifiers at which the set of data-processing jobs is to be run, and
   a set of data block identifiers of data block to be processed during the set of data-processing jobs; and
   wherein the resource warmer is operable to, in advance of processing the set of data-processing lobs:
   receive the at least one of the set of compute node identifiers and the set of data block identifiers; and
   warm up the cluster portion by transferring a data block from a first compute node at which it resides to a second compute node, in the cluster, with available processing logic.

4. The system of claim 2, wherein the resource warmer is operable, during an anticipatory warm-up period, to:
   warm up, during processing by the cluster of a previous data-processing lob from the job queue, the cluster portion, at least in part, by at least one of:
   loading a data block to be processed during the set of data-processing jobs into a cache of a node in the cluster for processing; and
   warming up a relevant network resource in the cluster used to relay the data block to the node with the cache; and wherein
   the advance module is further operable to run the set of data-processing jobs without a latency of the anticipatory warm-up period, once the cluster portion has been warmed-up.

5. The system of claim 2, further comprising:
   a name node, the name node storing location information about locations where data blocks reside within the cluster according to a distributed filing system; and
   a conversion module operable to select, from locational awareness information stored in the name node, proximate and available nodes for mappers, where corresponding data units do not reside at compute nodes with requisite processing logic available for the mappers; and
   wherein at least one of the job analyzer and the resource warmer is operable to:
   access the location information from the name node, and
   apply information from the characterization information for the set of data-processing jobs to the location information to determine where data blocks to be processed during the set of data-processing jobs reside, the data blocks being indicated by the characterization information for the set of data-processing jobs, and
   warm up the cluster portion by provisioning the data units blocks to the selected nodes.

6. The system of claim 2, wherein the advance module is further operable to:
   determine that aspects of the cluster warmed up previously for the set of data-processing jobs may be utilized for a second data-processing job; and
   advance the second data-processing job out of the job queue; and
   initiate processing of the second data-processing job by the cluster.

7. The system of claim 2, wherein a portion of the data to be processed during the running of the data-processing job resides on a backend storage device outside of the cluster, the backend storage device being communicatively coupled to the cluster.

8. The system of claim 2, wherein the resource warmer is further operable to warm up the cluster portion, at least in part, by initiating a Java Virtual Machine (JVM).

9. The system of claim 2, further comprising a schedule control module operable to select a pool of data-processing jobs to be run concurrently, based on overlapping data block to be processed during one data-processing job in the pool also to be processed during another data-processing job in the pool, as indicated by characterization information extracted by the job analyzer.

10. A method for processing data sets comprising:
    reading, in advance of processing a set of data-processing jobs in a job queue, multiple data-processing jobs, comprising the set of data-processing jobs, in the job queue, each data-processing job in the multiple data-processing jobs configured for distributed processing of a data units on a cluster of nodes, the data blocks stored at multiple locations;

extracting, in advance of processing the set of data-processing jobs in the job queue, characterization information from the multiple data-processing jobs, the characterization information having information characterizing resources in the cluster for processing the multiple data-processing jobs; and initiating processing of, contrary to a default approach to processing data-processing jobs in the job queue, the set of data-processing jobs, upon warm-up operations satisfying a threshold for loading data blocks to be processed by the set into cache for mapper in a cluster portion identified by characterization information for the set, in anticipation of running the set.

11. The method of claim 10, further comprising:
analyzing the characterization information for the set of data-processing jobs for identification information that identifies at least one of:
a set of data blocks to be processed during the set of data processing jobs,
locations at which set of data blocks pertaining to the set of data-processing jobs are stored,
nodes in the cluster serviceable for processing the set of data blocks, and
network resources serviceable to provision data units in the set of data blocks to the nodes in the cluster;
warming up aspects of the cluster indicated by the identification information as aspects to be utilized in running the set of data-processing jobs; and
upon the aspects indicated by the identification information for the set warming up to a completion threshold, advancing the set of data-processing jobs contrary to positioning for the set of data-processing jobs relative to a First In First Out (FIFO) scheduling order.

12. The method of claim 11, wherein analyzing the characterization information for identification information comprises:
converting a set of mappers comprising the characterization information into at least one of a set of compute node identifiers serviceable for processing the set of data-processing jobs, and a set of data blocks identifying data blocks on which the set of data-processing jobs runs:
and further comprising,
selecting a pool of data-processing jobs to be run concurrently, based on overlapping data blocks to be processed during one data-processing job in the pool also to be processed during another data-processing job in the pool as indicated by characterization information extracted by the job analyzer.

13. The method of claim 11, wherein advancing the set of data-processing jobs further comprises avoiding a latency of a warmed-up period by warming up the aspects of the cluster during processing by the cluster, of a previous data-processing job from the job queue.

14. The method of claim 11, further comprising advancing a second data-processing job from the job queue, contrary to a position of the second data-processing job relative to a First In First Out (FIFO) scheduling order, that can utilize the aspects of the cluster warmed up previously for the set of data processing jobs.

15. The method of claim 10, further comprising:
identifying overlapping resources in the cluster to be used by more than one data-processing job from the characterization information;
selecting a pool of data-processing jobs to be run concurrently based on overlapping resources in the cluster that can be used to process the pool of data-processing jobs;
warming-up the overlapping resources; and
advancing for processing, the pool of data-processing jobs, contrary to a processing order of the data-processing jobs in the pool relative to a First In First Out (FIFO) scheduling order.

16. A data processing system comprising:
a cluster of nodes, each node having at least one of physical memory, a processor, and software for coordinating at least one of mapping and reducing operations within the cluster;
a distribution module operable to:
divide an input data file into multiple splits,
store at least one copy of each of the multiple splits as data units at multiple locations selected from at least one of the cluster of nodes and a backend storage device;
a name node within the cluster of nodes receiving locational awareness identifying the multiple locations of the data blocks;
a job analyzer operable to retrieve characterization information comprising a set of mappers for each of multiple a-data-processing jobs in a job queue; and
an advance module, coupled to the job analyzer, operable to initiate processing of, contrary to a default approach to processing data-processing jobs in the job queue, a set of data-processing jobs, upon warm-up operations satisfying a threshold for loading data blocks to be processed by the set into cache for mapper in a cluster portion identified by characterization information for the set, in anticipation of running the test.

17. The data processing system of claim 16, further comprising a resource warmer communicatively coupled to the job analyzer, the resource warmer operable to warm up the aspects of the cluster indicated by the characterization information for the set of data-processing jobs as relevant to processing the set of data-processing jobs in advance of processing the set of data-processing jobs so that the set of data-processing jobs may later run without a latency of a previously accomplished warm-up period.

18. The data processing system of claim 17, further comprising a conversion module, the conversion module operable to-convert the characterization information for the set to:
a set of compute node identifiers for nodes at which one of mapping and reducing functions for the data processing job occur; and
a set of data blocks indicating data blocks to be processed in accordance with the data-processing job, where at least one of the job analyzer, the resource warmer, and the conversion module is operable to retrieve the multiple locations at which the set of data blocks are stored from the name node; and
determine that the aspects of the cluster warmed up previously for the set of data-processing lobs may be utilized for a subsequent data-processing lob.

19. The data processing system of claim 17, wherein the control module is operable to warm up the aspects of the cluster indicated by the characterization information for the set by provisioning the set of data from the multiple compute nodes at which they are stored to caches of the different nodes indicated by the compute node identifiers.

20. The data processing system of claim 17, wherein the advance module is operable to advance the set of data-processing jobs for processing, contrary to a processing order for the set of data-processing jobs relative to a First In First Out (FIFO) scheduling order, upon receiving information that the aspects of the cluster indicated by the characterization information have reached a completion threshold.

* * * * *